(12) United States Patent
Desabhatla et al.

(10) Patent No.: US 11,404,879 B2
(45) Date of Patent: Aug. 2, 2022

(54) SYSTEMS AND METHODS FOR IMPROVED RATE OF CHANGE OF FREQUENCY RIDE-THROUGH IN ELECTRIC POWER SYSTEMS

(71) Applicant: General Electric Company, Schenectady, NY (US)

(72) Inventors: Sreedhar Desabhatla, Munich (DE); Scott William Szepek, Schenectady, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 268 days.

(21) Appl. No.: 16/809,891

(22) Filed: Mar. 5, 2020

(65) Prior Publication Data

US 2021/0281078 A1 Sep. 9, 2021

(51) Int. Cl.
*H02J 3/38* (2006.01)
*F02C 6/00* (2006.01)
*F02C 9/00* (2006.01)
*G05B 13/04* (2006.01)

(52) U.S. Cl.
CPC ............... *H02J 3/381* (2013.01); *F02C 6/00* (2013.01); *F02C 9/00* (2013.01); *G05B 13/048* (2013.01); *F05D 2220/76* (2013.01); *H02J 2203/20* (2020.01)

(58) Field of Classification Search
CPC .. H02J 3/381; H02J 2203/20; H02J 13/00002; H02J 2203/10; H02J 3/241; F02C 6/00; F02C 9/00; G05B 13/048; F05D 2220/76; Y02E 40/70; Y02E 60/00; Y04S 10/12; Y04S 10/30
See application file for complete search history.

(56) References Cited

U.S. PATENT DOCUMENTS

| | | | |
|---|---|---|---|
| 2010/0170219 A1* | 7/2010 | Venkataraman | F23R 3/346 60/39.463 |
| 2016/0077507 A1* | 3/2016 | Sheble | G06Q 10/06 700/295 |
| 2016/0222816 A1* | 8/2016 | Chen | F01D 15/10 |
| 2016/0285265 A1* | 9/2016 | Lin | H02J 3/0073 |

FOREIGN PATENT DOCUMENTS

WO WO-2018217189 A1 * 11/2018 ............. G05B 13/02

* cited by examiner

*Primary Examiner* — Ziaul Karim
(74) *Attorney, Agent, or Firm* — Eversheds Sutherland (US) LLP (57) ABSTRACT

This application provides methods and systems for rapid load support for grid frequency transient events. Example electric power systems may include a turbine, a generator coupled to the turbine, where the generator is configured to provide power to an electrical grid, and a controller configured to detect a grid event, determine a rate of change of frequency (rate of change of frequency) value, determine a predicted post-grid event governor set point based on the rate of change of frequency value, and initiate a change to at least one turbine operating parameter based on the predicted post-grid event governor set point.

19 Claims, 5 Drawing Sheets

SYSTEMS AND METHODS FOR IMPROVED RATE OF CHANGE OF FREQUENCY RIDE-THROUGH IN ELECTRIC POWER SYSTEMS

TECHNICAL FIELD

This application and the resultant patent relate generally to electric power systems and more particularly relate to improved rate of change of frequency ride-through in gas turbine power systems.

BACKGROUND OF THE INVENTION

Many known electric power systems include several types of electric power generating units, such as, for example, synchronous generating units and/or non-synchronous generating units. Synchronous generating units are those in which the output voltage waveform generated during operation is synchronized with the rotation of an element (e.g., a prime mover) within the generating unit. Synchronous generating units typically include a rotating mass that rotates within the generating unit to generate output power. Non-synchronous generating units are those in which the output voltage waveform generated during operation is not necessarily synchronized with the rotation of a mass within the generating unit, because, for example, the non-synchronous generating unit may not include such a rotating mass. Examples of non-synchronous generating units include, solar or wind power generating units. At least some conventional electric power systems have adequately tolerated the loss of one or more generating units or loss of loads within the electric power system through the presence of a large number of synchronous generating units distributed within the system.

More particularly, because a synchronous generating unit may include a rotating mass (e.g., the prime mover and generator), it is possible to compensate for the loss of a generating unit or loss of loads within the electric power system of larger grids by distributing the deficit or surplus in electrical power within the system over the remaining number of generating units, which rotate with inertia sufficient to absorb, or "ride-through" the loss (although the rotating mass within each synchronous generating unit may turn more slowly). However, in some instances, in particular for smaller grids, ride-through may not be possible when a large frequency transient event occurs because of an inability to correctly determine an operating state after a transient event is complete. The negative effects of transient events, such as sudden changes to grid frequency, are amplified for smaller grids, such as grids that provide a load capacity of about 500 megawatts (MW). Smaller grids are often less stable than larger grids since a load change of the same magnitude will result in a larger frequency change. Thus, smaller grids tend to experience frequency changes more often than larger grids. A lack of stability may result in blackouts and/or loss of power to the grid. Systems and methods for improved rate of change of frequency ride-through are therefore desired to increase the stability of power to a grid.

SUMMARY OF THE INVENTION

This application and the resultant patent provide improved rate of change of frequency ride-through in gas turbine power systems. The system may include a turbine, a generator coupled to the turbine, where the generator is configured to provide power to an electrical grid, and a controller configured to detect a grid event, determine a rate of change of frequency (rate of change of frequency) value, determine a predicted post-grid event governor set point based on the rate of change of frequency value, and initiate a change to at least one turbine operating parameter based on the predicted post-grid event governor set point.

This application and the resultant patent further provide a method for riding-through grid events for gas turbines. The method may include detecting, by a controller, a grid event, determining a rate of change of frequency value, determining a predicted post-grid event governor set point based on the rate of change of frequency value, and initiating a change to at least one turbine operating parameter for a gas turbine based on the predicted post-grid event governor set point.

This application and the resultant patent further provide a system for riding-through grid events for gas turbines. The system may include a gas turbine, a generator coupled to the gas turbine, where the generator is configured to provide power to an electrical grid, and a controller configured to detect a grid event, determine a rate of change of frequency value, determine an estimated magnitude of the grid event based on the rate of change of frequency value, determine a predicted post-grid event governor set point based on the estimated magnitude of the grid event, determine a destination mode for combustion using the predicted post-grid event governor set point, and initiate a change to an air/fuel ratio based on the destination mode.

These and other features and improvements of this application and the resultant patent will become apparent to one of ordinary skill in the art upon review of the following detailed description when taken in conjunction with the several drawings and the appended claims.

DETAILED DESCRIPTION

Figure 1:
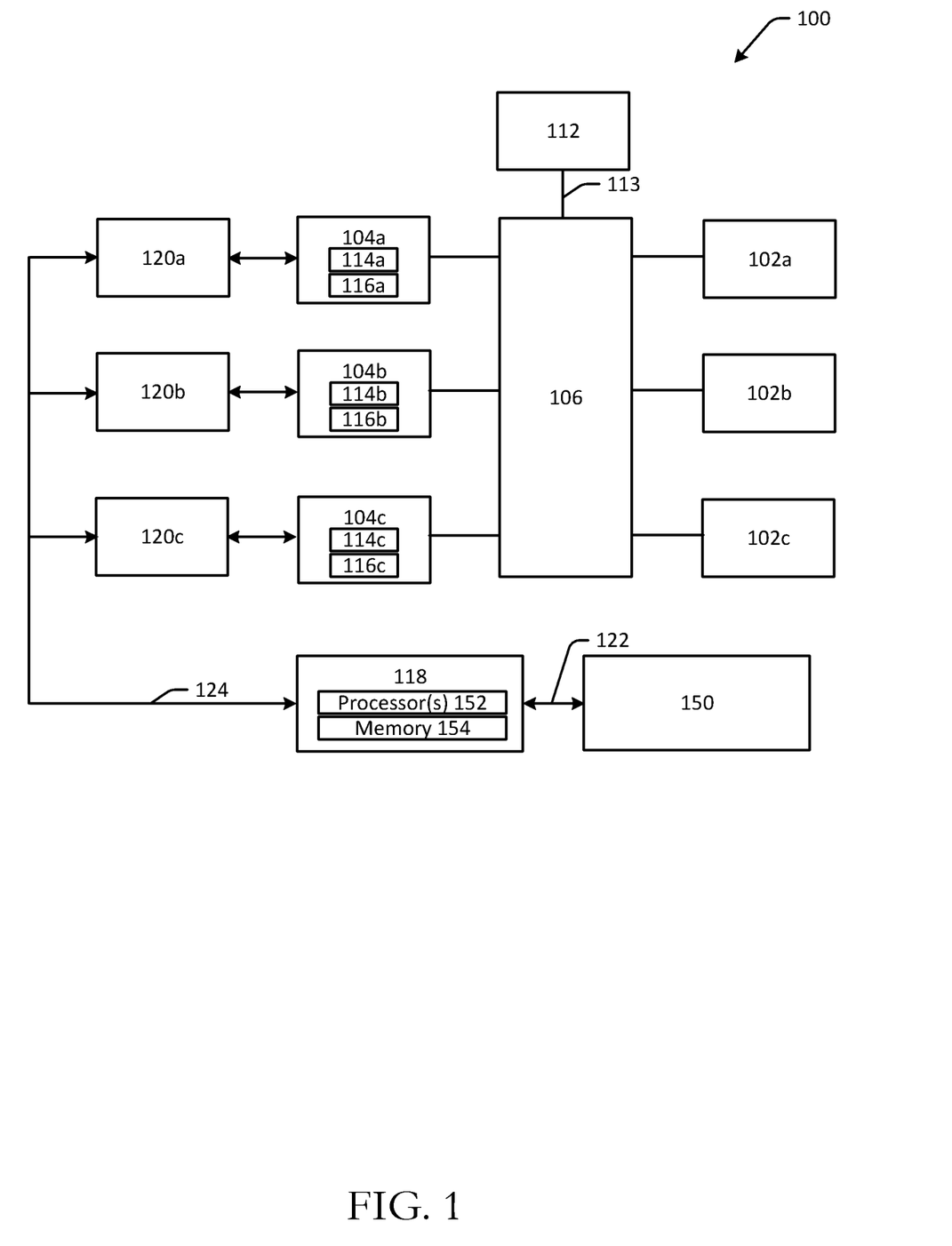
FIG. 1 is a schematic diagram of an example electric power system.

Referring now to the drawings, in which like numerals refer to like elements throughout the several views. FIG. 1 is a schematic diagram of an electric power system 100. The electric power system 100 may include a number of generating units and a number of electrical loads coupled to the generating units. Any number of generating units, loads, and other common electric power system components may be included.

The electric power system 100 may include one or more electrical system components, such as a first electrical load 102a, a second electrical load 102b, and/or a third electrical load 102c. The electric power system 100 may also include one or more generating units, such as a first generating unit 104a, a second generating unit 104b, and/or a third generating unit 104c. In the illustrated embodiment, generating units 104a-104c may be synchronously connected gas turbine generating units. However, in other embodiments, generating units 104a-104c may be any generating unit that includes a rotating prime mover, such as steam turbine generating units, reciprocating engine generating units, hydro-turbine generating units, and the like. In some embodiments, electric power system 100 may include at least one electrical power transmission and distribution system component 106, such as, for example, one or more transmission lines, one or more distribution lines, one or more transformers, one or more voltage regulators, and the like. An interconnected electrical power transmission and distribution system component 106 may thus facilitate the supply of electrical power from generating units 104a-104c to one or more electrical loads 102a-102c.

The electric power system 100 may optionally include a non-synchronous power source 112, such as a wind and/or a solar electric power system. Non-synchronous power source 112 may be coupled to electrical power transmission and distribution system component 106 through a power line, such as an non-synchronous source line 113, and may supply electrical energy to one or more electrical loads 102a-102c via electrical power transmission and distribution system component 106.

Some or all of the generating units 104a-104c may include at least one controller and/or at least one sensor. For example, generating unit 104a may include a controller 114a and a sensor 116a, generating unit 104b may include a controller 114b and a sensor 116b, and generating unit 104c may include a controller 114c and a sensor 116c. Each controller 114a-114c may include a processor and a non-transitory computer-readable memory communicatively coupled to the processor.

The electric power system 100 may include a number of event estimators 120a, 120b, and 120c. In various embodiments, each event estimator 120a-120c may include at least one processor and may be installed within a particular generating unit 104a-104c. In some embodiments, each event estimator 120a-120c is not a separate hardware component but is embodied as software that executes on a respective controller 114a-114c of each generating unit 104a-104c. In addition, in some embodiments, each event estimator 120a-120c may be implemented on a standalone computing device that is communicatively coupled to a respective controller 114a-114c of the respective generating unit 104a-104c.

The electric power system 100 may include a network estimator 118. In various embodiments, network estimator 118 may include at least one processor 152 coupled to at least one non-transitory computer-readable memory 154. In some embodiments, network estimator 118 may be implemented on a computing device, such as a workstation computer, a personal computer, a tablet computer, a smart phone, and the like.

The network estimator 118 may be communicatively coupled (e.g., over a communications network, such as the internet) to one or more data sources 150, such as one or more databases and/or database servers. Data sources 150 may be online and/or offline data sources and may include or store a variety of information associated with electric power system 100, such as a variety of status information. Network estimator 118 may also be communicatively coupled to each event estimator 120a-120c.

The status information received by network estimator 118 via data sources 150 may include any status information associated with electric power system 100, such as, for example, location information, timing information, and/or maintenance activity information, such as scheduled outage information for at least one of generating units 104a-104c, electrical loads 102a-102c, electrical power transmission and distribution system component 106, and/or non-synchronous power source 112. Status information may also include information describing rotational inertia associated with each generating unit 104a-104c, a total rotational inertia associated with generating units 104a-104c within electric power system 100, and/or a proportion of electrical power being generated at any given time in electric power system 100 by non-synchronous power source 112. This status information may be transmitted over a computer network via at least one grid signal 122.

Status information may also be detected by one or more sensors within electric power system 100, such as, for example, sensors 116a-116c, which may detect an operational status of each generating unit 104a-104c, such as a rotational velocity, a temperature, an output voltage, an output current, an output frequency, valve position, a system identifier (e.g., a serial number), and/or a fuel type of generating units 104a-104c. Similarly, a sensor (not shown) coupled to electrical power transmission and distribution system component 106 may detect one or more characteristics thereof, such as, for example, at least one of a type, location, time of occurrence, and severity of a fault, a voltage, a current, a frequency, and a system identifier. Likewise, one or more sensors (not shown) coupled to electrical loads 102a-102c may detect characteristics thereof, such as, for example, an voltage, an current, an frequency, a location, at least one of a type, location, time of occurrence, severity of a fault, and/or a system identifier.

The status information detected by one or more sensors with electric power system 100, such as by sensors 116a-116c, may also be used by controllers 114a-114c to detect the occurrence of a rate of change of frequency event and/or a grid event within electric power system 100. For example, where a sensor 116a-116c detects a large increase or decrease in the frequency or speed of a corresponding generating unit 104a-104c, a respective controller 114a-114c may determine that a rate of change of frequency event has occurred.

Accordingly, the network estimator 118 receives status information via grid signal 122 and determines or obtains at least one network characteristic representative of an operational status of electric power system 100, such as for, example, at least one frequency characteristic of electric power system 100. More particularly, network estimator 118 uses status information to generate at least one model of electric power system 100. For example, network estimator 118 may analyze the status information to generate a model of the electric power system 100, such as a look-up table that correlates a plurality of rate of change of frequency values with one or more electric power system characteristics, such as one or more frequency characteristics. The model may thus include and/or describe one or more characteristics of the electric power system 100 and may represent one or more interrelationships between elements coupled to the electric power system 100, such as between generating units 104a-104c and electrical loads 102a-102c. In addition, network estimator 118 may transmit all or a part of the model, such as a model look-up table, of the electric power system 100 to each event estimator 120a-120c.

The model of the electric power system 100 may identify one or more characteristics of the electric power system 100 and/or generating units 104a-104c, such as a settling frequency, a settling power, a frequency peak, and/or a frequency nadir. These characteristics may be based upon an analysis of the status information associated with electric power system 100. To this end, the model provided to each event estimator 120a-120c may include a look-up table that cross-references a plurality of rate of change of frequency values with a plurality of characteristics, such as a plurality of settling frequencies, a plurality of settling powers, a plurality of frequency peaks, and/or a plurality of frequency nadirs. In general, a settling frequency and a settling power are the speed or frequency and the output power, respectively, into which a generating unit 104a-104c "settles" or stabilizes after the occurrence of a grid event and/or after a primary response to a rate of change of frequency event and/or grid event has been deployed within electric power system 100. Similarly, a frequency nadir is the lowest output power frequency occurring as a result of a grid event, and a frequency peak is the highest output power frequency occurring as a result of a grid event. In the exemplary embodiment, the model may be transmitted via a network signal 124 to each event estimator 120a-120c, and each event estimator 120a-120c may store the model (including associated characteristics) in a memory, such as, for example, in a non-transitory computer-readable memory.

The network estimator 118 may receive and/or collect status information on a periodic basis (e.g., once every fifteen minutes, etc.) to update the model of the electric power system 100. The updated model may include updated characteristics associated with electric power system 100 and may be transmitted to one or more event estimators 120a-120c for storage. In various embodiments, network estimator 118 may receive feedback from one or more event estimators 120a-120c, such as feedback about an estimated characteristic in comparison to an actual or measured characteristic. For instance, a particular event estimator 120a-120c may use a look-up table to estimate a particular frequency nadir based upon a measured or sensed rate of change of frequency value. The particular event estimator 120a-120c may receive from a sensor 116a-116c, an actual frequency nadir occurring as a result of the rate of change of frequency event, and an error or difference between the estimated frequency nadir and the actual frequency nadir may be returned as an error value to network estimator 118. Similarly, the actual frequency nadir (rather than, or in addition to, the error value) may be returned to network estimator 118.

As used herein, the phrase "grid event" refers to an abrupt change in total electrical power consumed within and/or generated by an electric power system. For example, a grid event may be associated with a sudden reduction of total generation or load within an electric power system due, for example, to loss (or tripping) of one or more generating units, one or more non-synchronous power sources, and/or one or more loads. In addition, as used herein, a "source rejection grid event" is an abrupt change in total electrical power generated by an electric power system, such as, for example, as a result of a loss of one or more generating units. Similarly, as used herein, a "load rejection event" is an abrupt change in total electrical power consumed by an electric power system, such as, for example, as a result of a loss of one or more loads.

These grid events may affect the power output by one or more generating units, such as, for example, one or more rotating gas turbine generating units, coupled to the electric power system. For example, during a source rejection grid event, one or more generating units still coupled to the electric power system may initially experience a reduction in rotational speed as each generating unit attempts to compensate for the loss of generation power within the electric power system. Similarly, during a load rejection event, the power output by the prime movers of the generating units coupled to the electric power system may exceed the power required for the total electrical load on the electric power system, which may result in an increase in the rotational speed associated with one or more of the generating units. As the rotational speed of the generating units within the electric power system increases and decreases, the frequency of the alternating electrical current and/or the voltage developed by the generating units within the electric power system may fluctuate rapidly. For convenience, these frequency fluctuations may be referred to herein as rate-of-change-of-frequency events (or "rate of change of frequency") events. Some machines may also trip during the process of responding to frequency changes. Rate of change of frequency events therefore occur as a result of one or more grid events and may lead, as described herein, to the loss of one or more other generating units on the electric power system, which may contribute, in turn, to overall electric power system instability. In addition, as described herein, rate of change of frequency events are associated with rate of change of frequency values, such as values ranging from zero to two Hertz/second. In some embodiments, a rate of change of frequency value may indicate a severity of an associated rate of change of frequency event.

Embodiments of the disclosure may be configured to enhance dry low NOx modes in gas turbines, when a large frequency transient happens in a small grid. Some embodiments may calculate an approximate nadir/peak change in the amplitude of frequency in the first 200-300 milliseconds after the transient. For example, a network estimator or other computer system associated with the electric power system may be configured to measure or otherwise determine the rate of change of frequency immediately after the start of the grid event. Instead of an acceleration based dry low NOx mode switch/fuel management, the gas turbine control can modulate air-fuel ratios, dry low NOx modes, different fuel splits across combustion nozzles, and/or other response actions that can avoid transient instability of the gas turbine. In some embodiments, early electrical detection can be used to identify the initiation of a grid event, which can then trigger a calculation of the delta change in average frequency (e.g., using a weighted average technique of units inertia, operating point on units capability, and/or megawatt margin available) and operating machines. This calculation can be provided as a feed forward control parameter to a turbine controller to readjust the air/fuel splits and avoid unnecessary changes in operating parameters. Accordingly, embodiments may enhance the flame stability and overall gas turbine transient stability.

The systems and methods described herein facilitate ride-through, by one or more generating units coupled to the electric power system, in response to the occurrence of high rate of change of frequency events within the electric power system. More particularly, the systems and methods described herein provide a substantially real-time generating unit control scheme and enable prompt and effective corrective action for generating units to ride-through high rate of change of frequency events in electric power systems.

Figure 2:
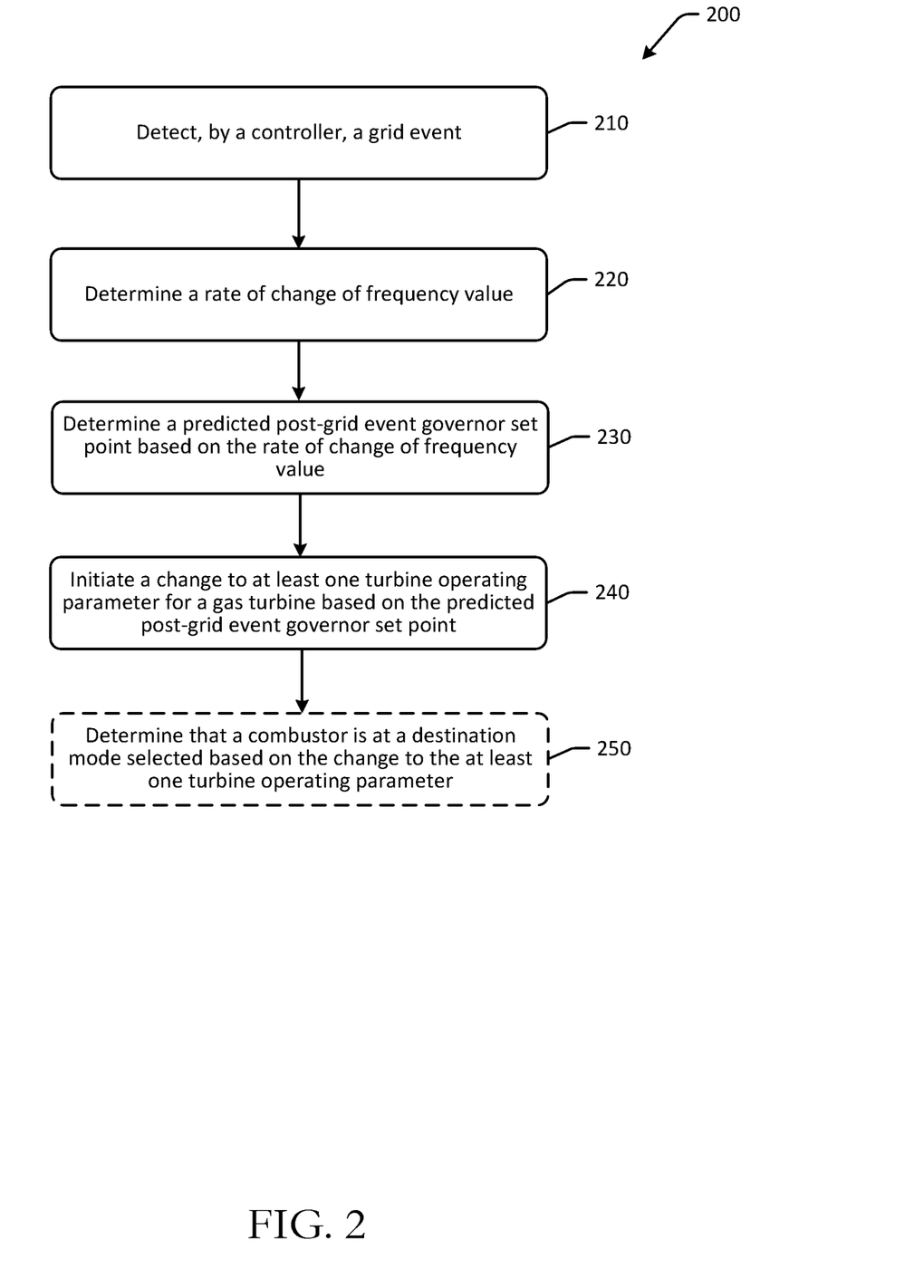
FIG. 2 is an example process flow for improved rate of change of frequency ride-through as may be described herein.

FIG. 2 is an example process flow 200 for improved rate of change of frequency ride-through as may be described herein. Other embodiments may have additional, fewer, and/or different operations than those discussed with respect to the example illustrated in FIG. 2.

The process flow 200 may be performed, for example, by one or more controllers associated with an electric power system. For example, the process flow 200 may be performed by a network estimator by executing computer-executable instructions using one or more computer processors.

At block 210, a grid event may be detected by a controller. For example, a controller associated with the electric power system may be configured to detect a grid event, which may be a frequency transient event. Detection may occur using an early electrical detection program or other suitable method. In some embodiments, prior to detecting the grid event, the controller may determine an estimated system inertia. In some embodiments, the controller may be configured to detect frequency drops in an electrical grid as a potential disturbance. For example, the controller may be configured to monitor one or more features or electrical properties of an electrical grid, such as a frequency, voltage, current, power, or power factor associated with the electrical grid. Based on changes in electrical grid features or electrical properties, the controller may determine whether a transient event is present on the electrical grid. For example, if one or more of frequency, voltage, current, power, or power factor associated with the electrical grid increases or decreases more than a threshold, the controller may determine that a transient event is occurring or otherwise about to occur. In one example, the controller may sense a rate of change of electrical frequency at terminals of a generator and may determine a rate of change of shaft line acceleration (where the rate of change is one of the electrical properties monitored by the controller) in order to determine whether a transient event is occurring. When a transient event is detected, the controller may send a notification of the transient event to a turbine controller. Because the controller may be coupled to the generator and the exciter, the controller may detect grid events faster and more reliably than speed measurement techniques.

At block 220, a rate of change of frequency value may be determined. For example, to determine the rate of change of frequency value, the controller may perform a calculation using the following formula:

$$\Delta P_x = -\frac{M}{f_0}\dot{f}_{t0}$$

$M$ = Kinetic Energy Stored in all rotating masses
$\dot{f}$ = Rate of Change of Frequency (RoCoF)
$f_o$ = Rated Frequency
$k_p$ = Composite droop of all gens
$k_{pi}$ = Droop of $i$-th generator In instances where the estimated system inertia is determined prior to detecting the grid event, to determine the rate of change of frequency value, the controller may determine a weighted average of the estimated system inertia, operating point of the turbine, and available megawatt margin of the electric power system. The size of the disturbance may be a function of system inertia (H) or kinetic energy (M) and the rate of change of frequency at t=0.

In embodiments where the grid event is a frequency transient event, and the controller may be configured to determine the rate of change of frequency value within about 200 or about 300 milliseconds after the grid event is detected.

In some embodiments, the controller may be configured to determine an estimated nadir, an estimated high nadir value, and an estimated low nadir value using the rate of change of frequency value. The controller may optionally determine an updated nadir estimation after a threshold length of time has elapsed. In addition, in some embodiments, the controller may be configured to determine a feed forward controller parameter based on the rate of change of frequency value. The feed forward controller parameter may be used by other controllers to adjust operating parameters of electric system components, such as gas turbine combustor fuel flow.

At block 230, a predicted post-grid event governor set point may be determined based on the rate of change of frequency value. For example, to determine the predicted post-grid event governor set point, the controller may perform a calculation using the following formula:

$$\Delta P_{pi\infty} = \frac{k_{pi}}{k_p}\Delta P_x$$

In some embodiments, the controller may determine an estimated magnitude of the grid event based on the rate of change of frequency value. In such instances, the predicted post-grid event governor set point may therefore be a function of droop and the estimated magnitude of the grid event.

At block 240, a change to at least one turbine operating parameter based on the predicted post-grid event governor set point may be initiated. For example, the controller may be configured to initiate a change to one or more turbine operating parameter based on the predicted post-grid event governor set point. Examples of changes to turbine operating parameters may include a change to at least one of an air/fuel ratio, a dry low NOx mode, or a fuel split across combustion nozzles.

At optional block 250, the controller may be configured to determine that a combustor is at a destination mode that is selected based on the change to the at least one turbine operating parameter. For example, in some embodiments, the controller may be configured to determine a destination mode for combustion using the predicted post-grid event governor set point. The destination mode may be an expected end state or settling point of a gas turbine after completion of a grid event, as discussed with respect to FIG. 5. In some embodiments, the change to the at least one turbine operating parameter may cause the turbine to switch to a transition mode at a first time and the destination mode at a second time. The destination mode may be selected from a set of available destination modes having different combustion configurations. The turbine may transition from a default mode to a transition mode, from the transition mode to a transition recovery mode, and from the transition recovery mode to the destination mode within about two seconds of the grid event. The electric power system, and more specifically the gas turbines of the electric power system, may therefore be configured to ride-through rate of change of frequency values of up to 2 Hz per second.

Figure 3:
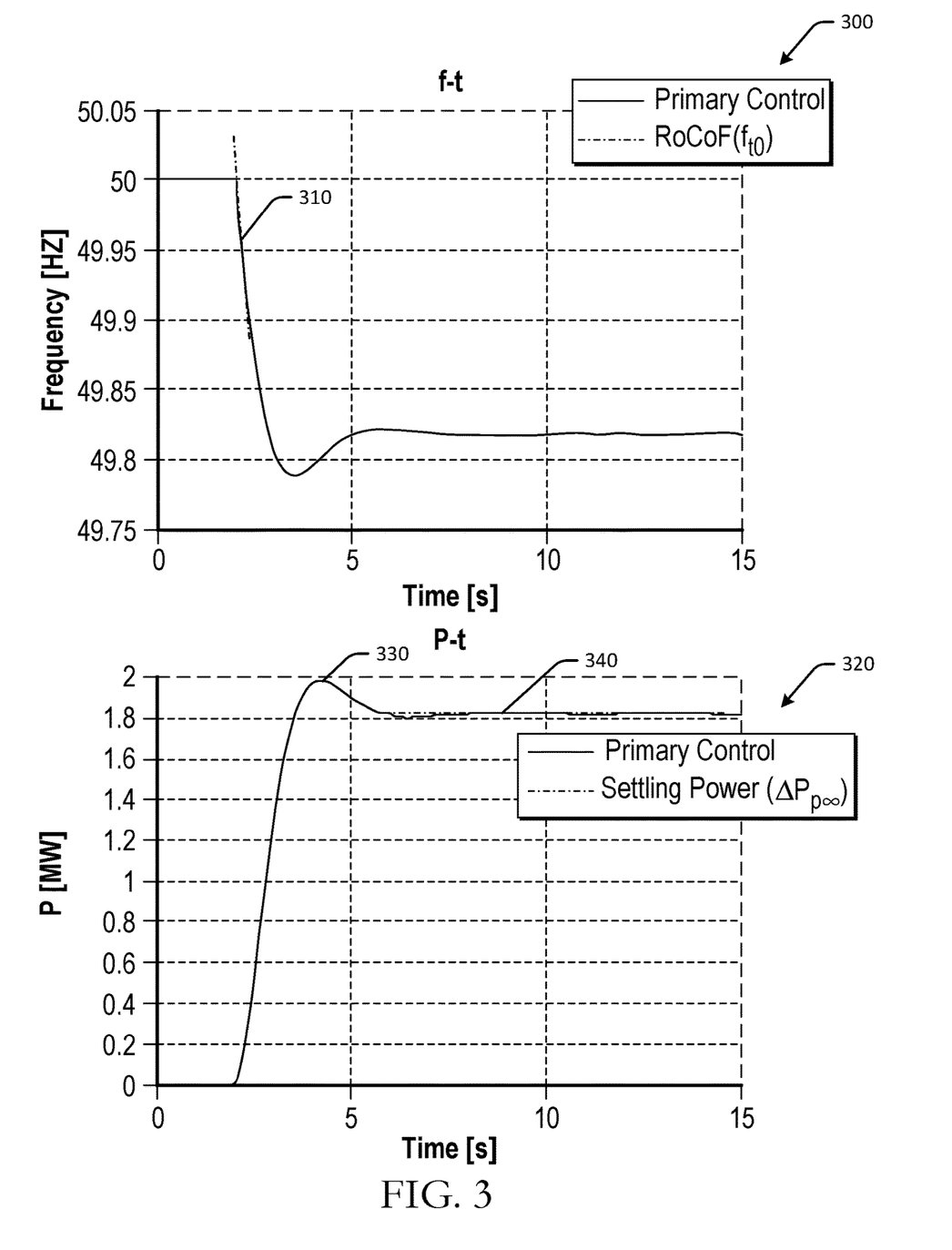
FIGS. 3-4 are schematic diagrams illustrating various graphs related to determination of factors that are used to improve rate of change of frequency ride-through as may be described herein.
Figure 4:
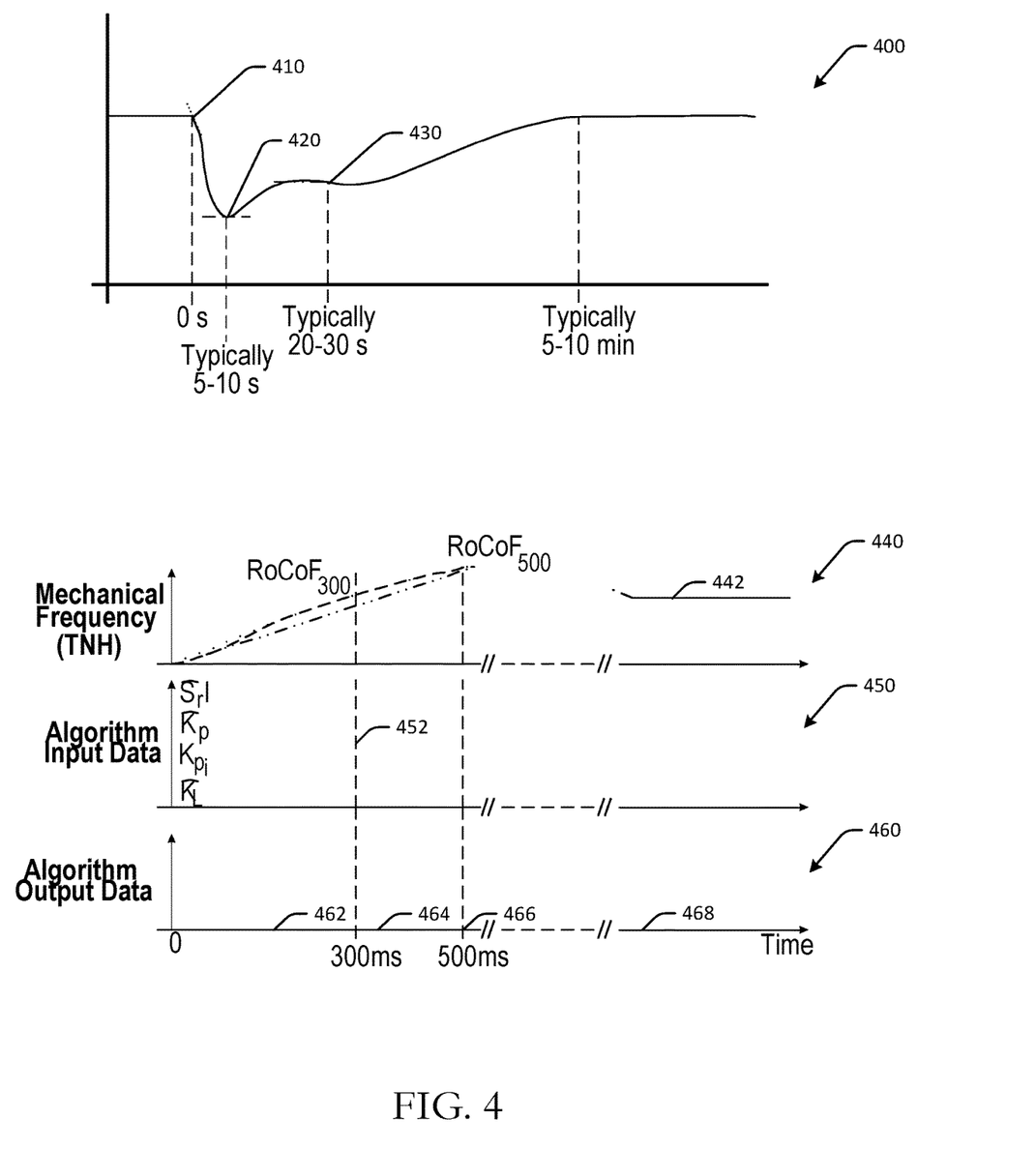

FIGS. 3-4 are schematic diagrams illustrating various graphs related to determination of factors that are used to improve rate of change of frequency ride-through as may be described herein.

In FIG. 3, a first graph 300 illustrates measured frequency over time, where a rate of change 310 is determined at or near (e.g., just before or just after) the beginning of a grid event. The first graph 300 may depict a qualitative plot of frequency response without secondary control. The initial rate of change of frequency is determined by system inertia and the amount of load/generation change. Within about 5-10 seconds, the nadir or low point of the measured frequency may be detected, and the frequency may settle after about 20-30 seconds. The amount of disturbance power may be determined from the rate of change of frequency and the kinetic energy stored in the rotating masses of the synchronous area, which may be calculated using a formulas such as:

$$\rightarrow (S_{rG}T_G + S_{rM}T_M)\frac{\dot{f}}{f_0} = \Delta P_p + \Delta P_s - k_L\Delta f - \Delta P_x$$

$S_{rG}$ = Total rated Menerator power $S_{rM}$ = Total rated Motor power $T_0$ = Mech. starting time of all Generators ($T_0 = 2H_o$)

$T_M$ = Mech. starting time of all Motors ($T_M = 2H_o$)

$$\rightarrow \Delta P_x = -\frac{M}{f_0}\dot{f}_{t0}$$

$M$ = Kinetic Energy Stored in all rotating masses $\dot{f}$ = Rate of Change of Frequency (RoCoF)

$f_0$ = Rated Frequency $\Delta P_x$ = Power disturbance

A second graph 320 in FIG. 3 illustrates power over time, where a peak power 330 occurs at substantially the same time as the low frequency point, and where settling power 340 occurs shortly thereafter. The second graph 320 may depict a qualitative plot of primary control power without secondary control. The governor set point may therefore be set to match the predicted settling power 340 in advance of the completion of the grid event. The contribution of the i-th generator to the total settling primary control power from the disturbance power, composite droop of all generators, and the droop of the i-th generator may be determined using a formula such as:

$$\Delta P_{pi\infty} = -\left(\frac{k_{pi}}{k_L + k_p}\frac{M}{f_0}\right)\dot{f}_{t0}$$

$M$ = Kinetic Energy Stored in all rotating masses $\dot{f}$ = Rate of Change of Frequency (RoCoF)

$f_o$ = Rated Frequency $k_L$ = Load damping constant $k_p$ = Composite droop of all generators $k_{pi}$ = Droop of $i$-th generator $\Delta P_{pi\infty}$ = Contribution of $i$-th generator Embodiments may therefore predict the post-disturbance governor set point to increase the rate of change of frequency capability of the system to about 2 Hertz/second. The rate of change of frequency value may be determined within 200-300 milliseconds, and the size of the power disturbance may be estimated. The settling power of the gas turbine may be estimated based on the estimated size of the power disturbance, and turbine parameters and/or a destination mode can be selected based on the estimated settling power.

FIG. 4 illustrates a third graph 400 depicting sample system frequency during transients. An initial rate of change of frequency 410 may be determined at a first point in time by system inertia and the amount of load/generation change. A nadir 420 may be detected at a second point in time. Settling power 430 may be determined at a third point in time. Primary frequency control may occur between the initial rate of change of frequency 410 and the settling power 430. The nadir 420 may be estimated within 300 milliseconds or less after the grid event. The estimated settling power may be determine within about 2 seconds after the grid event.

A fourth graph 440 in FIG. 4 depicts mechanical frequency measured over time, where a rate of change of frequency changes from 0 to 300 to 500, and then stabilizes at a stable frequency 442 before secondary control initializes. A fifth graph 450 in FIG. 4 depicts algorithm input data over time, where 6 samples (or another suitable amount) of mechanical frequency, power, and voltage are collected and used to measure and/or determine nadir and settling power. A sixth graph 460 in FIG. 4 depicts algorithm output data over time, where a best guess nadir and highest/lowest nadir values are output at a first point in time 462 (e.g., 250 milliseconds, etc.), an updated nadir estimation is output at a second point in time 464 (e.g., 325 milliseconds, etc.) after the samples are collected in the fifth graph 450, an expected settling power is output at a third point in time 466 (e.g., 500 milliseconds, etc.), and updated equivalent inertia, composite droop of all generators, and load damping constant are output at a fourth point in time 468.

Figure 5:
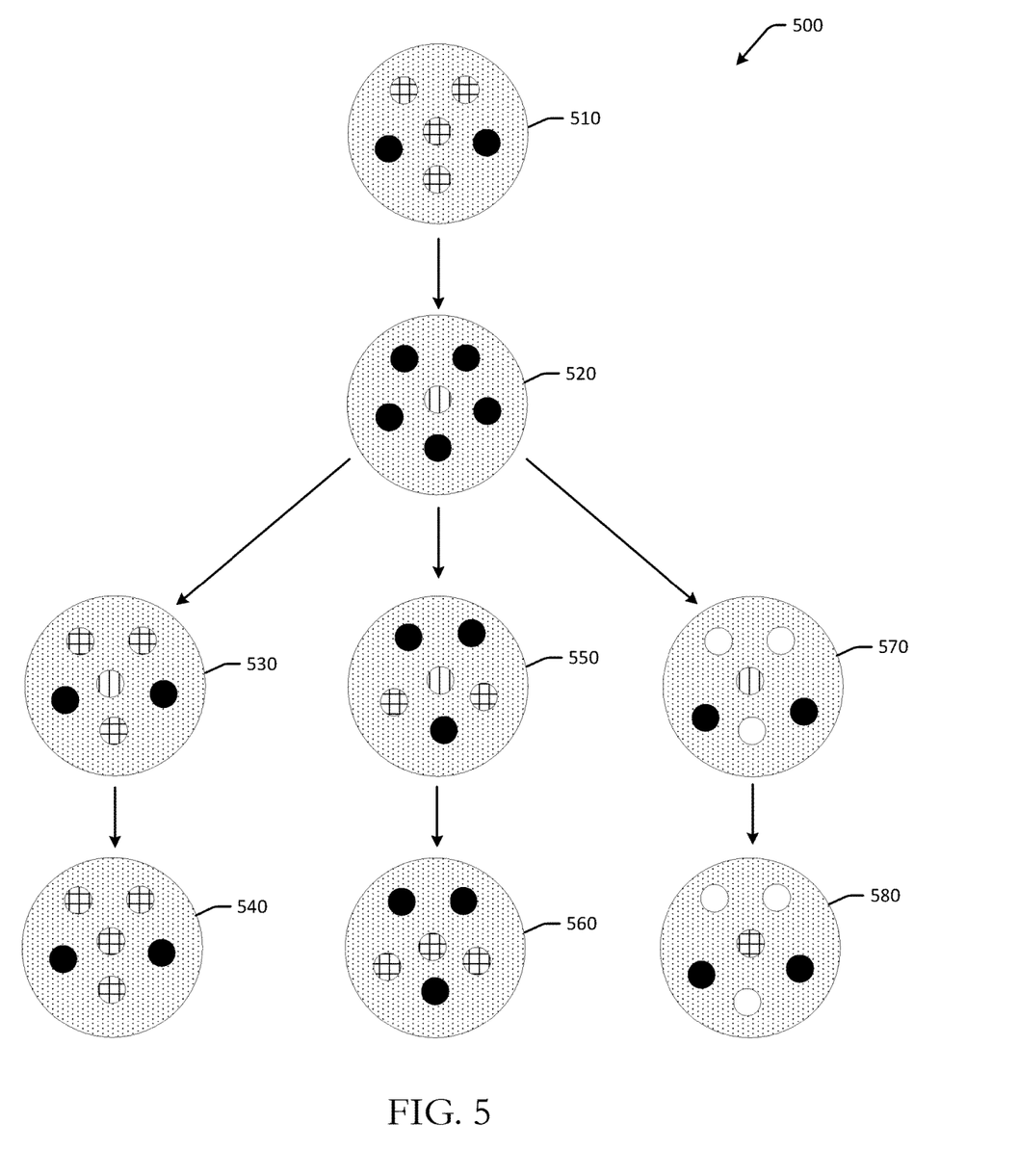
FIG. 5 is a schematic illustration of destination strategy determination after detection of grid frequency transient events as may be described herein.

FIG. 5 is a schematic illustration of destination strategy 500 determination after detection of grid frequency transient events as may be described herein. Other embodiments may have additional, fewer, and/or different components or configurations than those discussed with respect to the example illustrated in FIG. 5.

In FIG. 5, a first mode 510 may be an initiation mode, or a combustor mode during which a grid event occurs. Certain circuits may be fueled while others may be unfueled.

A second mode 520 may be a transition initiation mode, during which inner recovery may be emphasized by fueling certain circuits. For example, fuel may be biased toward a certain circuit to avoid lean blowout. Embodiments may be configured to avoid or reduce the number of times the turbine goes to a transition mode, such as the second mode 520. The time to shift modes between the first mode 510 and the second mode 520 may be less than about 0.3 seconds after the grid event. To determine that the mode is to be shifted, the estimated nadir value may be used.

A third set of modes 530, 550, 570 may be various transition recovery modes with different fuel flows and configurations. The respective fuel flows may include different splits and may be determined using look-up tables.

A fourth set of modes 540, 560, 580 may be various destination modes with various fuel flows and configurations that may correspond to different settling powers. The destination mode that is selected by the controller may be locked in until the speed transient subsides. The rate of change of frequency may not be equal across the system. The shift from the transition initiation mode to the destination mode may occur within about 2 seconds after the event, thereby minimizing time at both the second mode 520 and any one of the third set of modes 530, 550, 570. The estimated settling power may be used to select the appropriate destination mode.

In some embodiments, a controller associated with an electric power system may determine a destination mode for combustion using the predicted post-grid event governor set point, where the destination mode is selected from a set of available destination modes having different combustion configurations, such as the fourth set of modes 540, 560, 580.

The above-described systems and methods thus facilitate ride-through, by one or more generating units coupled to the electric power system, in response to the occurrence of rate of change of frequency events within the electric power system. More particularly, the systems and methods described herein provide a substantially real-time generating unit control scheme and enable prompt and effective corrective action for generating units to ride-through rate of change of frequency events in electric power systems.

It should be apparent that the foregoing relates only to certain embodiments of this application and resultant patent. Numerous changes and modifications may be made herein by one of ordinary skill in the art without departing from the general spirit and scope of the invention as defined by the following claims and the equivalents thereof.

We claim:

1. An electric power system comprising:
    a turbine;
    a generator coupled to the turbine, wherein the generator is configured to provide power to an electrical grid; and
    a controller configured to:
        detect a grid event;
        determine a rate of change of frequency value;
        determine a predicted post-grid event governor set point based on the rate of change of frequency value;
        determine a destination mode for combustion using the predicted post-grid event governor set point; and
        initiate a change to at least one turbine operating parameter based on the predicted post-grid event governor set point;
        wherein the change to the at least one turbine operating parameter causes the turbine to switch to a transition mode at a first time and the destination mode at a second time.

2. The electric power system of claim 1, wherein the controller is further configured to:
    determine a feed forward controller parameter based on the rate of change of frequency value.

3. The electric power system of claim 1, wherein the controller is further configured to:
    determine an estimated magnitude of the grid event based on the rate of change of frequency value.

4. The electric power system of claim 3, wherein the predicted post-grid event governor set point is a function of droop and the estimated magnitude of the grid event.

5. The electric power system of claim 1, wherein the controller is further configured to:
    determine an estimated nadir, an estimated high value, and an estimated low value using the rate of change of frequency value.

6. The electric power system of claim 5, wherein the controller is further configured to:
    determine an updated nadir estimation after a threshold length of time has elapsed.

7. The electric power system of claim 1, wherein the destination mode is selected from a set of available destination modes having different combustion configurations.

8. The electric power system of claim 7, wherein the turbine transitions from a default mode to a transition mode, from the transition mode to a transition recovery mode, and from the transition recovery mode to the destination mode within 2 seconds of the grid event.

9. The electric power system of claim 1, wherein the controller is further configured to:
    determine an estimated system inertia prior to detecting the grid event.

10. The electric power system of claim 9, wherein to determine the rate of change of frequency value, the controller is configured to:
    determine a weighted average of the estimated system inertia, operating point of the turbine, and available megawatt margin of the electric power system.

11. The electric power system of claim 1, wherein the turbine is configured to ride-through rate of change of frequency values of up to 2 Hz per second.

12. The electric power system of claim 1, wherein the change to the at least one turbine operating parameter is a change to at least one of an air/fuel ratio, a dry low NOx mode, or a fuel split across combustion nozzles.

13. The electric power system of claim 1, wherein the grid event is a frequency transient event, and wherein the rate of change of frequency value is determined within 300 milliseconds after the grid event is detected.

14. A method for riding-through grid events for gas turbines, the method comprising:
    detecting, by a controller, a grid event;
    determining a rate of change of frequency value;
    determining a predicted post-grid event governor set point based on the rate of change of frequency value;
    determining a destination mode for combustion using the predicted post-grid event governor set point; and
    initiating a change to at least one turbine operating parameter for a gas turbine based on the predicted post-grid event governor set point, wherein the change to the at least one turbine operating parameter causes the turbine to switch to a transition mode at a first time and the destination mode at a second time.

15. A system for riding-through grid events for gas turbines, the system comprising:
    a gas turbine;
    a generator coupled to the gas turbine, wherein the generator is configured to provide power to an electrical grid; and
    a controller configured to:
        detect a grid event;
        determine a rate of change of frequency value;
        determine an estimated magnitude of the grid event based on the rate of change of frequency value;
        determine a predicted post-grid event governor set point based on the estimated magnitude of the grid event;
        determine a destination mode for combustion using the predicted post-grid event governor set point; and
        initiate a change to an air/fuel ratio based on the destination mode, wherein the change to the at least one turbine operating parameter causes the turbine to switch to a transition mode at a first time and the destination mode at a second time.

16. The system of claim 15, wherein the controller is further configured to:
    determine an estimated nadir, an estimated high value, and an estimated low value using the rate of change of frequency value.

17. The system of claim 16, wherein the controller is further configured to: determine an updated nadir estimation after a threshold length of time has elapsed.

18. The system of claim 15, wherein the predicted post-grid event governor set point is a function of droop and the estimated magnitude of the grid event.

19. The system of claim 15, wherein the destination mode is selected from a set of available destination modes having different combustion configurations.

* * * * *